United States Patent [19]
McCreery

[11] 3,980,443
[45] Sept. 14, 1976

[54] TOOL HOLDER
[75] Inventor: James W. McCreery, Latrobe, Pa.
[73] Assignee: Kennametal Inc., Latrobe, Pa.
[22] Filed: Sept. 16, 1974
[21] Appl. No.: 506,556

[52] U.S. Cl. .................................. 29/96; 29/97
[51] Int. Cl.² .................................... B26D 1/00
[58] Field of Search .............. 29/96, 97; 82/36 R

[56] References Cited
UNITED STATES PATENTS

| | | | |
|---|---|---|---|
| 1,239,459 | 9/1917 | Carew | 29/96 |
| 3,488,822 | 1/1970 | Jones | 29/96 |
| 3,491,421 | 1/1970 | Holloway | 29/96 |
| 3,545,319 | 12/1970 | Anderson et al. | 82/36 R |

Primary Examiner—Leonidas Vlachos
Attorney, Agent, or Firm—Melvin A. Crosby

[57] ABSTRACT

A tool holder in which the holder comprises a support member with a block detachably mounted in a notch on one end of the support member and with the block being formed with a pocket in which a cutting insert is detachably mounted. Cam locking means are provided to lock the block in located position in the notch and interengaged rib and groove means on the support member and block accurately locate the block in the notch in the support member.

3 Claims, 12 Drawing Figures

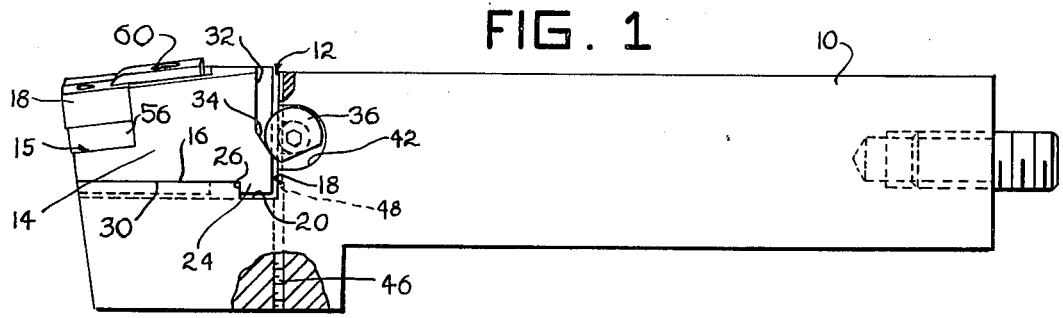
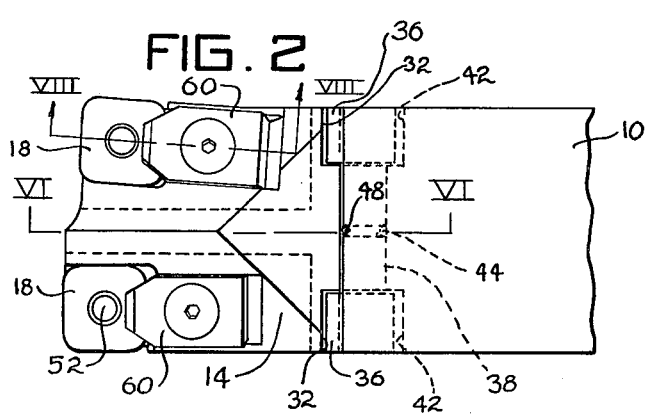
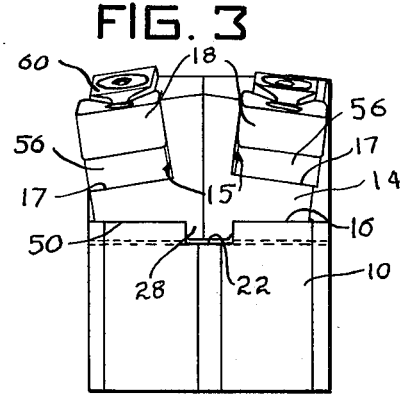
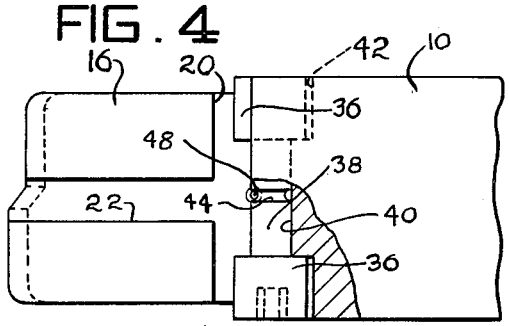
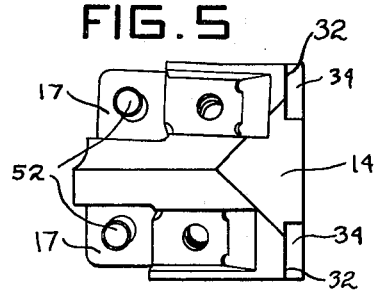
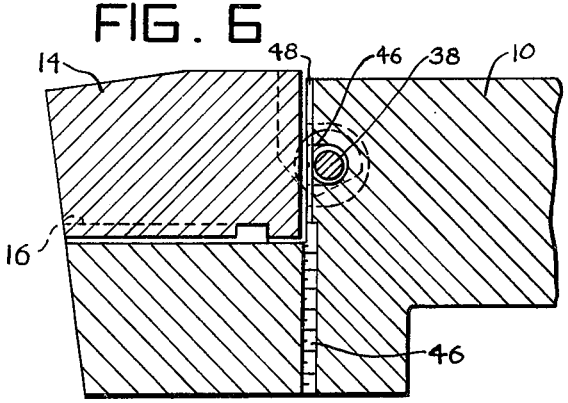
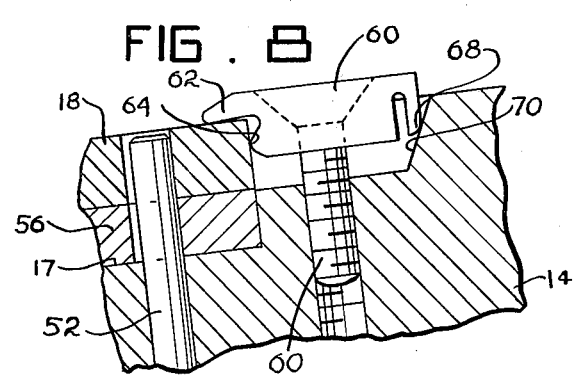

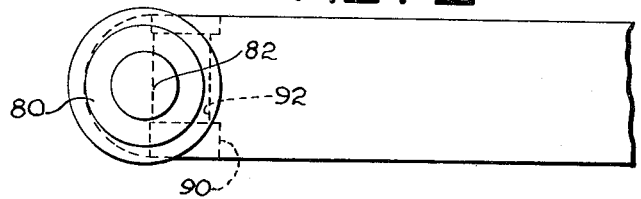
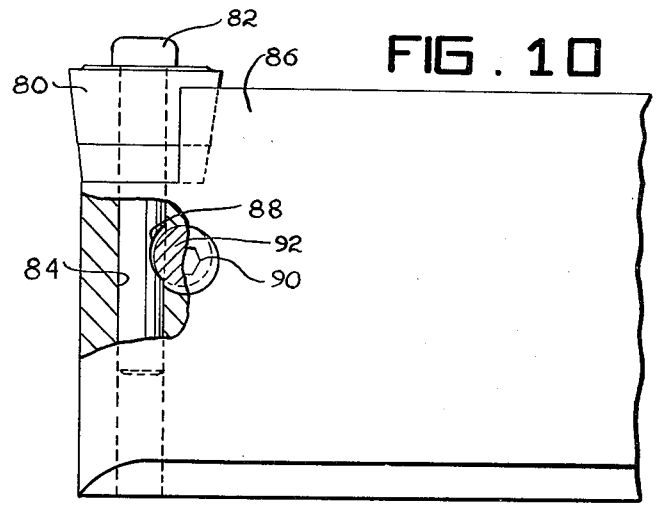
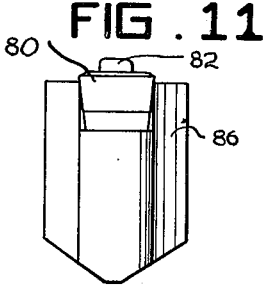
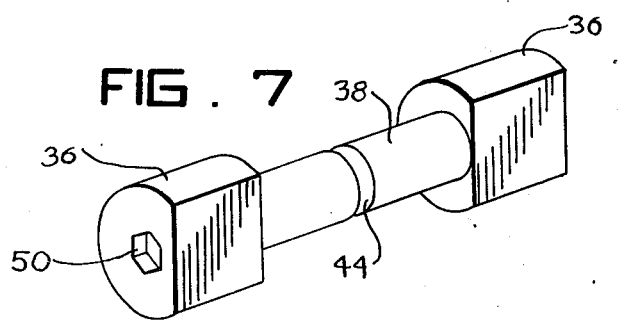
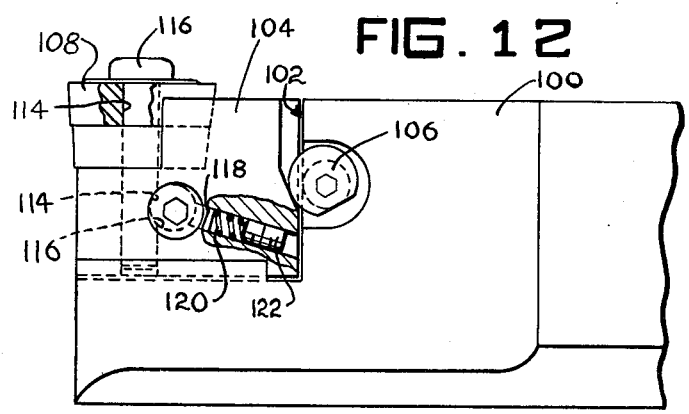

TOOL HOLDER

The present invention relates to tool holders, and is particularly concerned with heavy duty tool holders of the nature such as are employed for heavy turning operations and the like.

In performing heavy turning operations, cutting inserts are naturally subjected to considerable wear and abuse and require frequent indexing or replacement. At the same time, when doing heavy duty turning, considerable heat can be generated in the tool holder, especially at the cutting insert end and, more particularly still, directly in the cutting insert.

Thus, it is sometimes difficult for an operator quickly to replace a worn cutting insert when the tool has been carrying out heavy turning operations.

It is also the case that tools of the nature referred to are sometimes employed for numerically controlled machining operations and, in such cases, it is important to have the insert positioned precisely on the tool holder. Inserts can vary somewhat dimensionally, and when a machine is employed for numerically controlled machining operations, it is desirable to be able to preset the insert in a holding device externally of the machine tool and then the insert and the holding device can be placed in the machine tool in an accurate position.

With the foregoing in mind, a primary objective of the present invention is the provision of a tool holder arrangement for cutting inserts, especially for detachable cutting inserts, in which the tool holder includes a separable part in which the pocket is formed for holding the cutting insert.

A further object is the provision of an arrangement of the nature referred to which can be made large enough to support more than one cutting insert for compound machining operations.

A still further object is the provision of a tool holder arrangement of the nature referred to which is fairly simple to construct but in which the parts of the tool holder are accurately oriented relatively when assembled.

BRIEF SUMMARY OF THE INVENTION

According to the present invention, a tool holder is provided in the form of a bar-like support or the like adapted to be mounted in a clamp in a machine tool or which could even form a part of the machine tool. The support member is provided with an angular notch at one end with longitudinal and transverse locating surfaces thereon and receivable in the notch is a block having cooperating locating surfaces for engagement with the surfaces in the notch while a cam element is provided on one of the support member and block for fixedly connecting the block to the support member.

The block is provided with one or more pockets for receiving detachable cutting inserts and which cutting inserts are preferably indexable and may also be invertable.

When an insert becomes worn or broke or is to be replaced or indexed, the entire block can be removed from the support member and another block placed thereon so that machining can proceed without further delay while the removed block can be permitted to cool down so that the insert can be adjusted therein by replacement, indexing or inverting and, furthermore the precise position of the insert can, at that time, be adjusted, if necessary.

The objects referred to above as well as still other objects and advantages of the present invention will become more clearly apparent upon reference to the following detailed specification taken in connection with the accompanying drawings in which:

FIG. 1 is a side view of a tool holder arrangement according to the present invention.

FIG. 2 is a plan view looking down on top of the left side of the FIG. 1 arrangement.

FIG. 3 is an end elevational view looking in at the left end of FIG. 1.

FIG. 4 is a plan view looking down on top of the left end of the tool holder with the insert supporting block removed therefrom.

FIG. 5 is a plan view looking down on top of the insert supporting block with the inserts and clamp members removed therefrom.

FIG. 6 is a longitudinal sectional view indicated by line VI—VI on FIG. 2 drawn at somewhat enlarged scale showing the manner in which the insert supporting block interfits with the support member.

FIG. 7 is a perspective view showing a cam element which is employed for clamping the block to the support member.

FIG. 8 is a longitudinal section indicated by line VIII—VIII on FIG. 2 showing the manner in which a cutting insert is clamped into the insert supporting block.

FIG. 9 is a plan view showing how a single insert can be clamped to a tool holder by means of a cam and pin.

FIG. 10 is a side view of the FIG. 9 modification partly broken away.

FIG. 11 is a front end view of the FIGS. 9 and 10 modification.

FIG. 12 is a side view of a tool holder arrangement similar to what is shown in FIG. 6 but disclosing another manner of locking an insert in the pocket of the insert support block.

DETAILED DESCRIPTION OF THE INVENTION

Referring to the drawings somewhat more in detail, in FIGS. 1 to 8, 10 indicates a support member which may be in the form of a bar, for example, adapted for fixedly mounting in a machine tool. Support member 10 could be integral with the machine tool, if desired.

Support member 10 has an angular notch 12 formed in one end thereof and seated in the notch is a block 14 having pocket means 15 in which cutting inserts 18 are mounted. As will be seen in FIGS. 2 and 3, there may be two of the pockets 15 with an insert in each, but it will be understood that a single insert pocket could be provided in the block. The bottom walls 17 of the pockets incline downwardly in both the forward and laterally outward directions.

The notch 12 has an upwardly facing bottom wall 16 and a forwardly facing rearward wall 18. Bottom wall 16 is provided with a transverse recess 20, the rearward edge of which is coplanar with rearward wall 18 of the notch. Bottom wall 16 is also provided with a longitudinal recess 22 extending from recess 20 forwardly to the front edge of the notch.

The block 14, on the other hand, comprises a transverse rib 24 receivable with clearance in recess 20 and having a forward side 26 adapted for abutting engagement with the forward side of recess 20.

Block 18 also has a longitudinally extending dependent rib 28 closely receivable within recess 22. The transverse rib 24 and longitudinal rib 28 are more shallow than either of the recesses 20 and 22 so that the downwardly facing side 30 of the block takes a bearing on the upwardly facing bottom wall 16 of the notch.

Adjacent the side edges of block 14 at the rear there are provided substantially vertically extending undercut regions 32 each of which commences at the top of the block and terminates in about the middle of the heighth of block 14 in an inclined cam surface 34. Each cam surface inclines forwardly in the upward direction as will be seen in FIG. 1.

Cooperating with cam surfaces 34 are the eccentric end parts 36 of a rotatable cam member having a reduced diameter central section 38 seated in a lateral groove 40 formed into the forwardly facing rearward wall 18 of the notch in support member 10. Support member 10 is provided with enlarged recessed regions 42 at the ends of groove 40 within which the eccentric end parts 36 of the pin are rotatable with clearance.

Cam member 38 has a central annular undercut region, or groove, 44 and threaded upwardly into the bottom of support member 10 is a screw 46 having a pin shaped end part 48 engaging groove 44 on the forwardly facing side thus holding the cam member captive within lateral groove 40.

In operation, the block 14 is set in place in notch 12 and then the cam member with the eccentric end parts is rotated and the eccentric end parts 36 of the cam member engage the inclined cam surfaces 34 and press the block 14 downwardly and forwardly in notch 12 thereby accurately locating the block in the notch and fixedly holding the block in position in the notch.

The machining loads imposed on the block 14 are generally downwardly and rightwardly as the tool is viewed in FIG. 1, and the block is firmly supported against deflection due to the machining loads in the aforesaid manner.

Each end part 36 of the cam member 38 advantageously is provided with a wrench socket 50 so that it can be rotated from either side of the support member 10.

As to the clamping of the inserts 18 in the pockets 15, the block has a pin 52 for each pocket upstanding perpendicularly from the bottom wall 17 of the respective pocket and adapted for entering a central hole in the insert 18. The insert 18 is preferably backed up by a hard shim member 56 as will be seen in FIG. 8.

On the rearward side of each insert is a clamp member 60 having a lip portion 62 engaging the top of the respective insert 18 and having a nose portion 64 engaging the rearwardly facing wall of the insert. A clamp screw 66 is provided extending downwardly through the clamp member and into the block 14. The screw 66 has some clearance in the radial direction relative to the clamp member 60 so that the clamp member can adjust itself in the fore and aft direction and also into a tilted position relative to the screw.

At the end of the clamp member 60 opposite the insert end, the clamp member has a rounded heel part 68 which is slidable on the inclined wall 70 at the rearward end of the recess in which the clamp member is mounted.

In the described arrangement, when screw 66 is tightened up, the insert is pressed downwardly in pocket 15 and is simultaneously pushed leftward therein into firm bearing engagement with pin 52 and the insert is thereby accurately located and clamped in block 14.

It will be appreciated that the mounting of the inserts in the block 14 can be carried out with the block mounted in support member 10 or with the block removed therefrom so that the arrangement of the present invention provides for considerable flexibility and convenience.

In FIGS. 9 to 11, an insert 80 has a headed pin 82 extending therethrough to a bore 84 in support member 86. Pin 84 has a notch 88 therein and rotatably mounted in support member 86 is a pin 90 having an eccentric portion 92 engageable with notch 88. By the described arrangement, an insert can readily be mounted in a holder and clamped therein by availing of pin 90 while the holder can be quite simply constructed.

FIG. 12 shows a modification quite similar to that of FIG. 1 wherein a support member 100 is provided with a notch 102 on one end in which an insert support block 104 is mounted by availing of a cam member 106 having eccentric end parts in the same manner as was described in detail in connection with FIG. 1.

The insert 108 in FIG. 12, however, has a headed pin 110 extending downwardly through center hole 112 in the insert with the pin having a notch 114 in one side and adapted for engagement by eccentric pin 116 mounted in the block.

Advantageously, pin 116 is engaged by a friction element 118 pressed against the pin by spring 120, the spring taking a bearing at the end opposite member 118 on a screw 122.

The friction member provides that the pin 116 will remain in adjusted positions and will not become loose during work operations.

Modifications may be made within the scope of the appended claims.

What is claimed is:

1. In a tool holder; a support member having a notch in one end with a planar rearward wall and a planar bottom wall at right angles to one another, a block receivable in said notch and having a planar rear side adajcent said rearward wall and a planar lower side adjacent said bottom wall, said rear side and lower side of said block being at right angles to one another, insert receiving pocket means in the upper side of said block at the forward end of the block, cooperating elements of rib and groove means on said bottom wall of said notch and said lower side of said block operable to interlock said block and support member against relative lateral movement and against relative fore and aft movement in at least one direction, and interengageable elements of relatively rotatable cam locking means on said block and support member, said cam locking means including a pair of laterally spaced rearwardly facing surface regions on opposite side regions of the rear side of the block which incline forwardly in the upward direction and a cam member rotatable in the support member and having eccentric regions at the ends engageable with said inclined surface regions, rotation of said cam member comprising the sole means for clamping said block in said notch in said support member and for releasing said block from said notch for removal thereof from said support member, said support member including a lateral recess therein formed inwardly into said rearward wall, said recess including enlarged end regions, said cam member having a central region rotatably seated in the recess between said enlarged ends and the said eccentric regions of said cam member being disposed in said enlarged end regions of said recess and in coplanar relation with said rearwardly facing surface regions on said block, said eccentric regions having flats thereon which substantially register with the plane of said rearward wall of said notch in the support member in one rotated position of said cam member.

2. A tool holder according to claim 1 in which said cam member includes an annular groove thereon between said cam portions, and pin means in said support member engaging said annular groove on the forward side of the cam member and holding said cam member captive on said support member.

3. A tool holder according to claim 1 in which said pocket means comprise a pair of pockets each having a bottom wall, the bottom walls of said pockets both inclining downwardly in the forward direction and also inclining downwardly in the laterally outward direction.

* * * * *